United States Patent
Yang et al.

(10) Patent No.: US 9,442,999 B2
(45) Date of Patent: Sep. 13, 2016

(54) METHOD AND SYSTEM EMPLOYING GRAPHICAL ELECTRIC LOAD CATEGORIZATION TO IDENTIFY ONE OF A PLURALITY OF DIFFERENT ELECTRIC LOAD TYPES

(71) Applicant: EATON CORPORATION, Cleveland, OH (US)

(72) Inventors: Yi Yang, Milwaukee, WI (US); Liang Du, Atlanta, GA (US); Dawei He, Beijing (CN)

(73) Assignee: EATON CORPORATION, Cleveland, OH (US)

( * ) Notice: Subject to any disclaimer, the term of this patent is extended or adjusted under 35 U.S.C. 154(b) by 630 days.

(21) Appl. No.: 13/912,819

(22) Filed: Jun. 7, 2013

(65) Prior Publication Data

US 2014/0365490 A1 Dec. 11, 2014

(51) Int. Cl.
*G06F 17/30* (2006.01)
*G01D 1/14* (2006.01)
*G01D 1/16* (2006.01)

(52) U.S. Cl.
CPC .......... *G06F 17/30598* (2013.01); *G01D 1/14* (2013.01); *G01D 1/16* (2013.01)

(58) Field of Classification Search
CPC .... G01D 1/14; G01D 1/16; G06F 17/30598; G06N 3/088; G06N 7/00; Y04S 20/38; G06K 9/0053; G06K 9/00536
USPC ......... 702/61, 64, 65, 70, 71, 72; 324/76.12, 324/521; 340/657; 361/78; 707/737, 748, 707/758; 706/15
See application file for complete search history.

(56) References Cited

U.S. PATENT DOCUMENTS

| 4,858,141 A | 8/1989 | Hart et al. |
| 5,483,153 A | 1/1996 | Leeb et al. |

(Continued)

FOREIGN PATENT DOCUMENTS

| GB | 2465367 A | 5/2010 |
| WO | 2010/005985 A1 | 1/2010 |

OTHER PUBLICATIONS

Costa, J. et al., "Automatic Data Classification by a Hierarchy of Self-Organizing Maps", 1999, pp. V-419-V-424.

(Continued)

*Primary Examiner* — John H Le
(74) *Attorney, Agent, or Firm* — Eckert Seamans Cherin & Mellott, LLC; Nathaniel C. Wilks; Grant E. Coffield

(57) ABSTRACT

A system for different electric loads includes sensors structured to sense voltage and current signals for each of the different electric loads; a hierarchical load feature database having a plurality of layers, with one of the layers including a plurality of different load categories; and a processor. The processor acquires voltage and current waveforms from the sensors for a corresponding one of the different electric loads; maps a voltage-current trajectory to a grid including a plurality of cells, each of which is assigned a binary value of zero or one; extracts a plurality of different features from the mapped grid of cells as a graphical signature of the corresponding one of the different electric loads; derives a category of the corresponding one of the different electric loads from the database; and identifies one of a plurality of different electric load types for the corresponding one of the different electric loads.

20 Claims, 14 Drawing Sheets

(56) References Cited

U.S. PATENT DOCUMENTS

| | | | |
|---|---|---|---|
| 5,717,325 | A | 2/1998 | Leeb et al. |
| 5,910,875 | A | 6/1999 | Tian et al. |
| 6,081,123 | A | 6/2000 | Kasbarian et al. |
| 2009/0072985 | A1 | 3/2009 | Patel et al. |
| 2013/0138651 | A1 | 5/2013 | Lu et al. |
| 2013/0138661 | A1 | 5/2013 | Lu et al. |
| 2013/0138669 | A1 | 5/2013 | Lu et al. |
| 2014/0067299 | A1* | 3/2014 | Lu ............... G06K 9/00536 702/65 |

OTHER PUBLICATIONS

European Patent Office, "International Search Report and Written Opinion", Aug. 27, 2014, 12 pp.

A. Bouloutas et al., "Fault Identification Using a Finite State Machine Model with Unreliable Partially Observed Data Sequences", IEEE Transactions on Communications, vol. 41, No. 7, Jul. 1993, pp. 1074-1083.

G. Hart et al., "Correcting Dependent Errors in Sequences Generated by Finite-State Processes", IEEE Transactions on Information Theory, vol. 39, No. 4, Jul. 1993, pp. 1249-1260.

Y. Du et al., "A Review of Identification and Monitoring Methods for Electric Loads in Commercial and Residential Buildings", Proc. 2010 IEEE Energy Conversion Conf. and Expo., Atlanta, GA, 2010, pp. 4527-4533.

H. Chang et al., "Load Recognition for Different Loads with the Same Real Power and Reactive Power in a Non-intrusive Load-monitoring System," Computer Supported Cooperative Work in Design, 2008 IEEE, pp. 1122-1127.

H. Chiang et al., "Optimal Capacitor Placements in Distribution Systems: Part 1: A New Formulation and the Overall Problem," IEEE Transactions on Power Delivery, vol. 5, No. 2, Apr. 1990, pp. 634-642.

Tiax LLC, "Commercial and Residential Sector Miscellaneous Electricity Consumption: Y2005 and Projections to 2030," Sep. 22, 2006, 97 pp.

L. Yee, "Voltage-Current Trajectory: A 2-Dimensional Approach to Understand Electrical Load Signatures", Abstract of Thesis, The University of Hong Kong, May 2007, 121 pp.

H. Lam et al., "A Novel Method to Construct Taxonomy Electrical Appliances Based on Load Signatures," IEEE Transactions on Consumer Electronics, vol. 53, No. 2, 2007, pp. 653-660.

C. Laughman et al., "Power Signature Analysis," IEEE Power & Energy Magazine, vol. 2, Mar./Apr. 2003, pp. 56-63.

T. Saitoh et al., "Current Sensor based Non-intrusive Appliance Recognition for Intelligent Outlet," 23rd International Technical Conference on Circuits/Systems, Computers and Communications, 2008, pp. 349-352.

S. Burdett et al., "A Study of Power Factor Correction Techniques for High Power AC Locomotives," International Conference on Main Line Railway Electrification, 1989, pp. 363-367.

F. Sultanem et al., "Using Appliance Signatures for Monitoring Residential Loads at Meter Panel Level," IEEE Transaction on Power Delivery, vol. 6, No. 4, Oct. 1991, pp. 1380-1385.

K. Suzuki et al., "Nonintrusive Appliance Load Monitoring Based on Integer Programming," SICE Annual Conference, 2008, pp. 2742-2747.

W. Chan et al., "Harmonics Load Signature Recognition by Wavelets Transforms," International Conference on Electric Utility Deregulation and Restructuring and Power Technologies, 2000, pp. 666-671.

A. Cole et al., "Nonintrusive Identification of Electrical Loads in a Three-phase Environment Based on Harmonic Content," Proc. 17th IEEE Instrumentation and Measurement Technology Conf., 2000, pp. 24-29.

U.S. Energy Information Administration, "Annual Energy Review 2011," U.S. Department of Energy, Washington DC, DOE/EIA-0384(2011), Sep. 2012, 390 pp.

D. He et al., "Front-End Electronic Circuit Topology Analysis for Model-Driven Classification and Monitoring of Appliance Loads in Smart Buildings," IEEE Transactions on Smart Grid, vol. 3, No. 4, Dec. 2012, pp. 2286-2293.

Lawrence Berkeley National Laboratory, "Standby Power", http://standby.lbl.gov, 2013, 1 p.

\* cited by examiner

METHOD AND SYSTEM EMPLOYING GRAPHICAL ELECTRIC LOAD CATEGORIZATION TO IDENTIFY ONE OF A PLURALITY OF DIFFERENT ELECTRIC LOAD TYPES

This invention was made with Government support under DE-EE0003911 awarded by the Department of Energy National Energy Technology Laboratory. The Government has certain rights in this invention.

BACKGROUND

1. Field

The disclosed concept pertains generally to electric loads and, more particularly, to methods of identifying different types of electric loads. The disclosed concept also pertains to systems for identifying different types of electric loads.

2. Background Information

Electric loads in commercial and residential buildings consumed about 75% of total electricity in the U.S. in 2012. However, a large portion of this electricity use has been wasted, and the management of this usage has often been overlooked. Many electric appliances with an external power supply, a remote control, a continuous display or a battery charger continuously draw power in an off or standby mode. Electric loads with external power supplies are also called plugged-in electric loads (PELs) (or miscellaneous electric loads in some contexts). PELs is one of the major load categories and accounts for more use than any other end-use service, such as heating and ventilation.

Standby power in the U.S. accounts for over 100 billion kWh and costs over $10 billion annually. As much as 75% of this cost can be saved by proper energy management. In order to achieve the Net-Zero-Energy-Building goals defined by the Department of Energy (DOE) for residential buildings by 2020 and for commercial buildings by 2025, the effective monitoring and management of PELs needs to be considered. Knowing the type of PELs is essential to enabling an effective solution.

Since the introduction of non-intrusive load monitoring (NILM) in the 1980s, numerous prior proposals have sought to develop various NILM solutions. A wide-range of known solutions is disclosed by Du et al., "A review of identification and monitoring methods for electric loads in commercial and residential buildings," Proc. 2010 IEEE Energy Conversion Conf. and Expo., 2010, pp. 4527-33.

A load identification system typically consists of several modules including data acquisition, data processing, event detection, feature extraction, and identity indication. The identity indication module compares the extracted features with a database of features of known loads and identifies unknown loads based on pre-defined rules, such as maximum similarity or learning results of artificial neural networks (ANNs).

The performance of almost all existing load identification methods highly depends on the electrical signatures of loads, which are defined to be "an electrical expression that a load device or appliance distinctly possesses". The objective is to extract useful features that can uniquely distinguish the individual PELs types or classes within a predetermined load set.

Many feature extraction methods have been proposed. For example, for steady state feature exploration, real and reactive power is utilized to identify load types. Also, peak current, average current and RMS current values can be used for load identification. Current harmonics are applied as the core features for identification to mainly address those loads with a nonlinear power supply. Further, a voltage-current (V-I) trajectory modeling method for load identification uses purely graphical shape features of the V-I trajectory of each load. Also, some transient state features, such as instantaneous admittance curves and transient power curves, can be employed.

The development of feature extraction and the assignment of each load type to a corresponding load group and subgroup has been purely data-driven. Even though many prior proposals demonstrate that satisfactory performance can be achieved by selecting a proper set of features for a targeted load set, there are no known guidelines to drive an optimized feature selection, and there is potentially a redundancy of information in any set of features. Moreover, the identification performance usually depends on the specific load set under study. It is believed that how well the performance of the developed classifier can be generalized to other load sets has not yet been addressed, and that there does not exist a set of electrical signatures such that every load can have a "distinct" expression.

Due to the complexity and nuances of devices and appliances, it is often challenging, if not impossible, to distinguish between loads that use the same interface circuit to a power line. For example, those PELs using a standardized direct current (DC) power supply with current harmonic reduction, such as DVD players, cable or satellite set-top boxes, and PC monitors, present very similar electrical signatures, and are not distinguishable by only using the steady state features. Hence, a truly meaningful load categorization method is often still desired.

There is room for improvement in methods of identifying different electric load types.

There is also room for improvement in systems for identifying different electric load types.

SUMMARY

These needs and others are met by embodiments of the disclosed concept which map a voltage-current trajectory to a grid including a plurality of cells each having a binary value; extract a plurality of different features from the mapped grid of cells as a graphical signature of a corresponding one of a plurality of different electric loads; derive a category of the corresponding one of the different electric loads from a hierarchical load feature database; and identify one of a plurality of different electric load types for the corresponding one of the different electric loads.

In accordance with one aspect of the disclosed concept, a system for a plurality of different electric loads comprises: a plurality of sensors structured to sense a voltage signal and a current signal for each of the different electric loads; a hierarchical load feature database comprising a plurality of layers, with one of the layers including a plurality of different load categories; and a processor structured to:

acquire a voltage waveform and a current waveform from the sensors for a corresponding one of the different electric loads; map a voltage-current trajectory to a grid including a plurality of cells, each of the cells being assigned a binary value of zero or one; extract a plurality of different features from the mapped grid of cells as a graphical signature of the corresponding one of the different electric loads; derive a category of the corresponding one of the different electric loads from the hierarchical load feature database; and identify one of a plurality of different electric load types for the corresponding one of the different electric loads.

As another aspect of the disclosed concept, a method of identifying load types for a plurality of different electric loads, the method comprising: sensing a voltage signal and a current signal for each of the different electric loads; providing a hierarchical load feature database comprising a plurality of layers, with one of the layers including a plurality of different load categories; acquiring a voltage waveform and a current waveform for a corresponding one of the different electric loads; mapping a voltage-current trajectory to a grid including a plurality of cells, each of the cells being assigned a binary value of zero or one; extracting a plurality of different features from the mapped grid of cells as a graphical signature of the corresponding one of the different electric loads; deriving a category of the corresponding one of the different electric loads from the hierarchical load feature database; and identifying one of a plurality of different electric load types for the corresponding one of the different electric loads.

BRIEF DESCRIPTION OF THE DRAWINGS

A full understanding of the disclosed concept can be gained from the following description of the preferred embodiments when read in conjunction with the accompanying drawings in which.

DESCRIPTION OF THE PREFERRED EMBODIMENTS

Figure 1A:
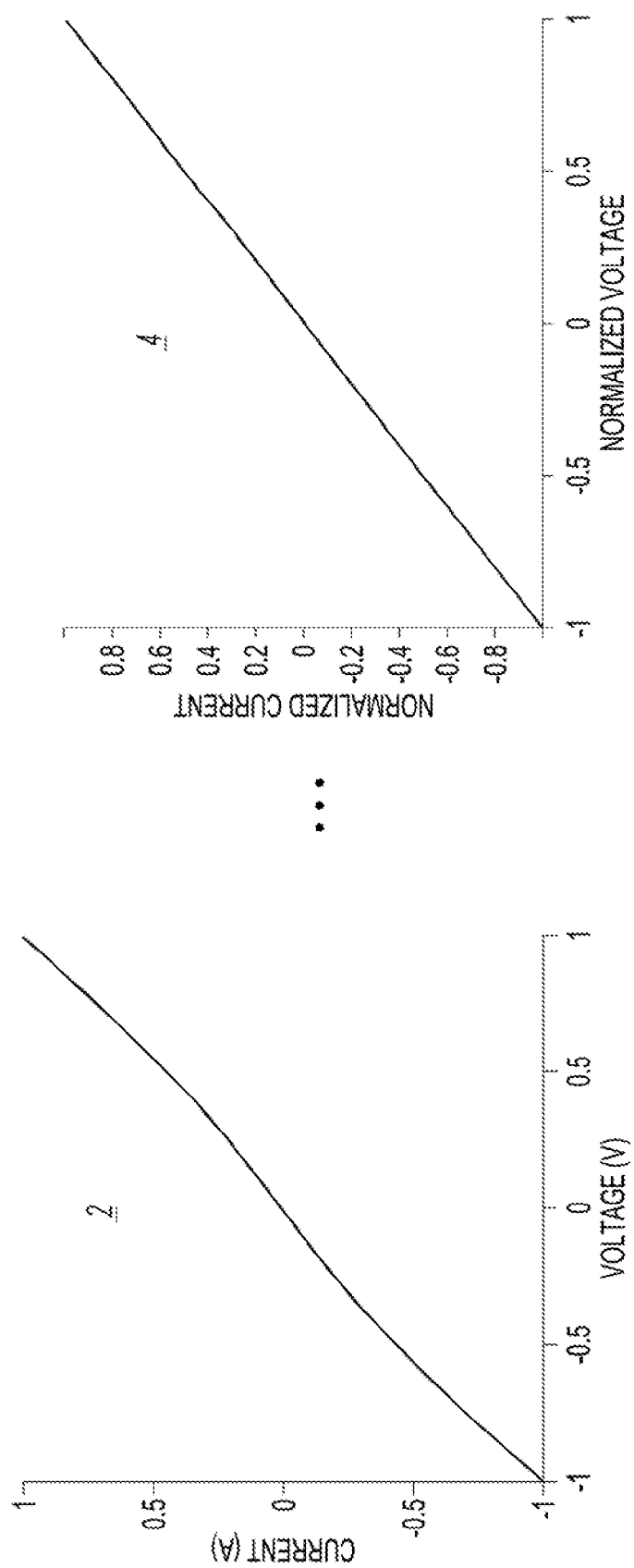
FIGS. 1A-1G are plots of current versus voltage and normalized current versus normalized voltage for V-I trajectories of representative loads in seven load categories in accordance with embodiments of the disclosed concept.
Figure 1B:
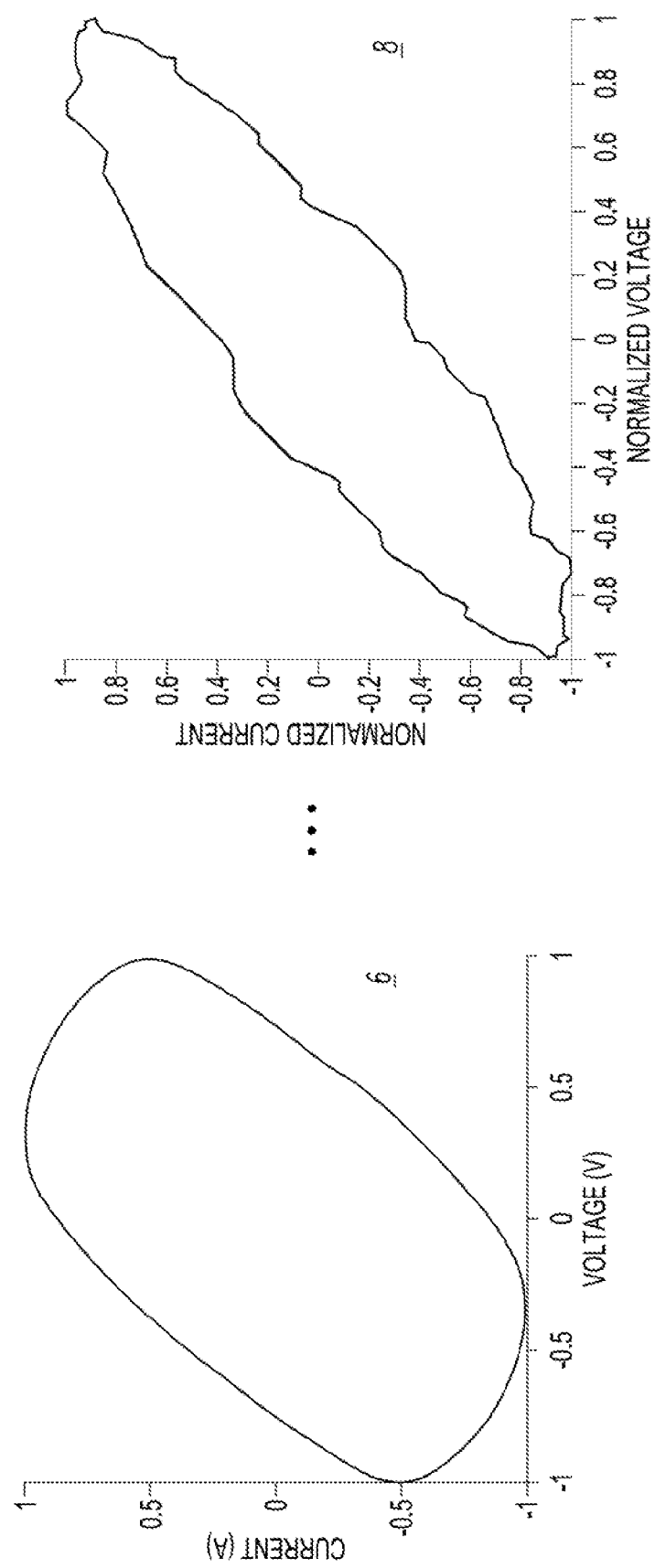
Figure 1C:
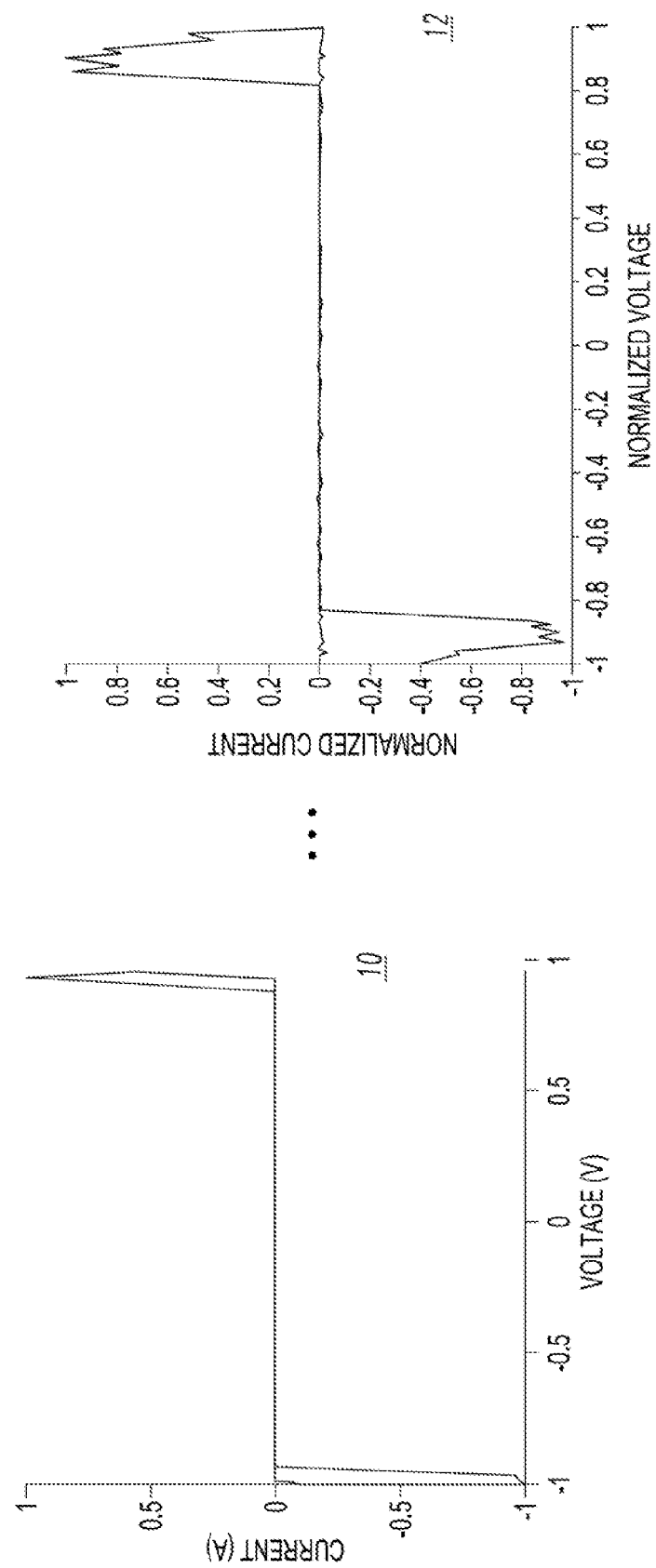
Figure 1D:
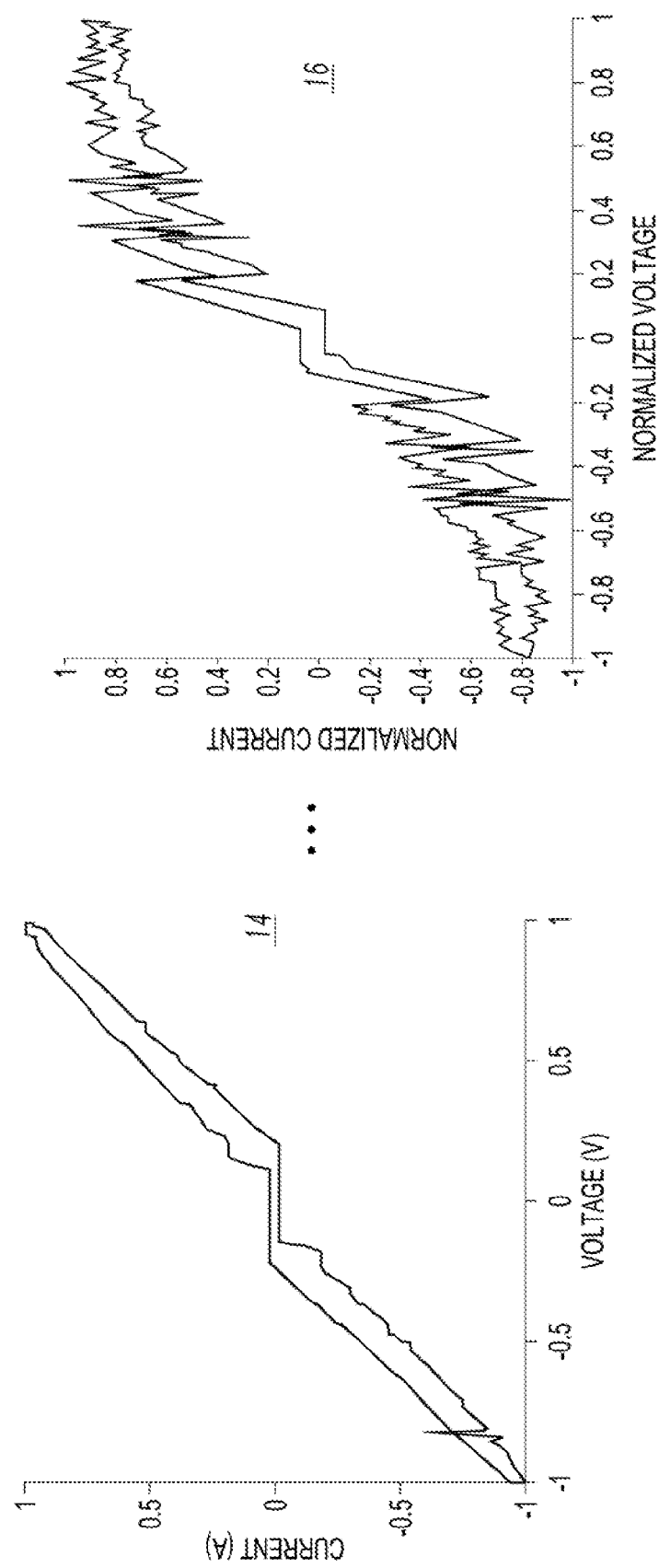
Figure 1E:
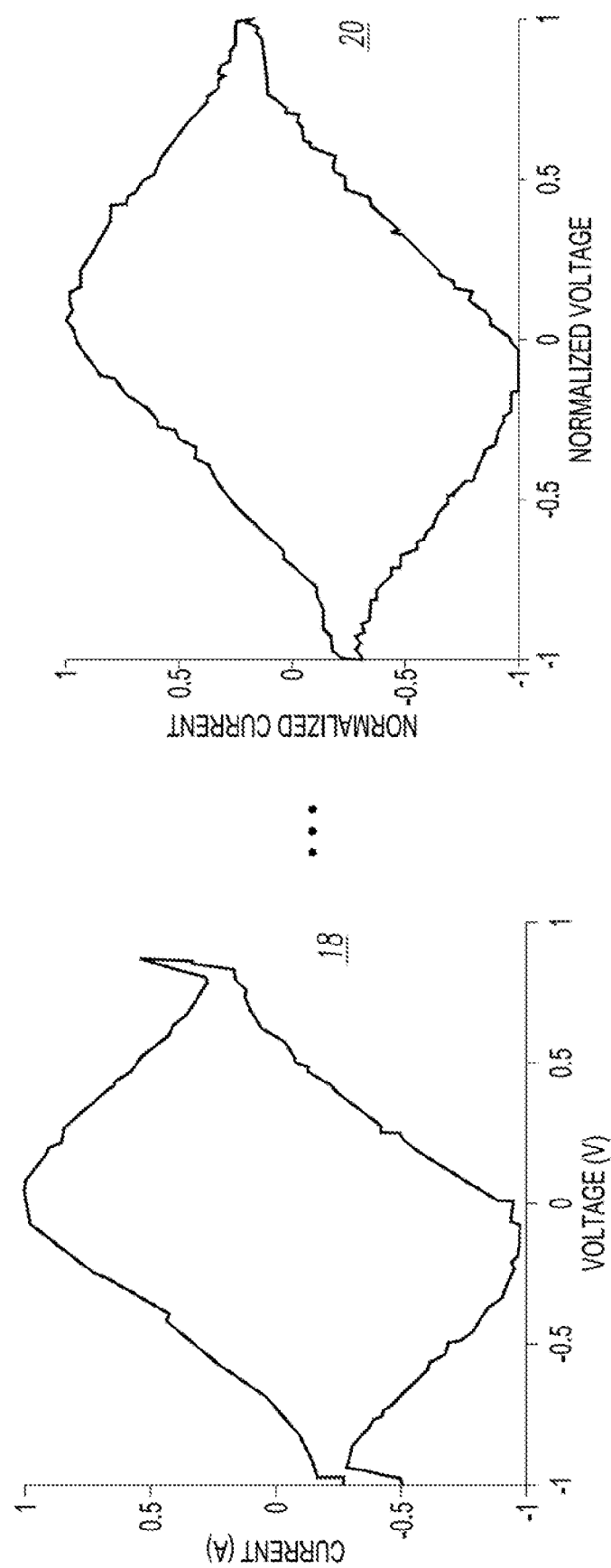
Figure 1F:
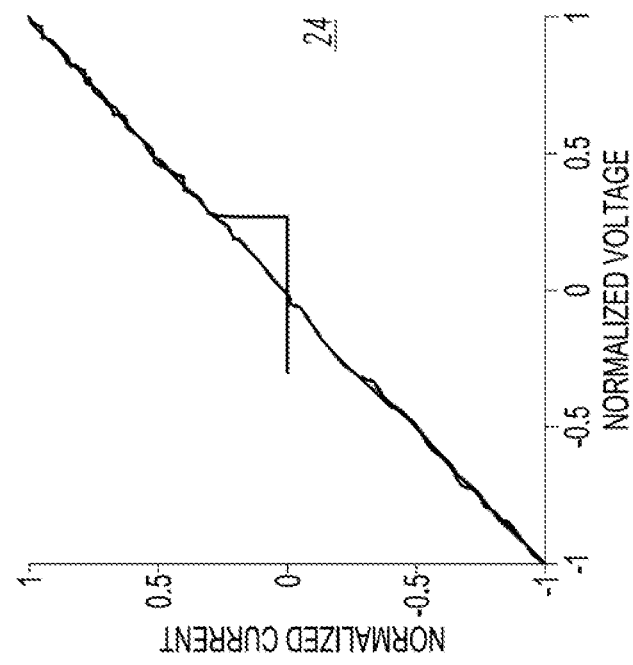
Figure 1F:
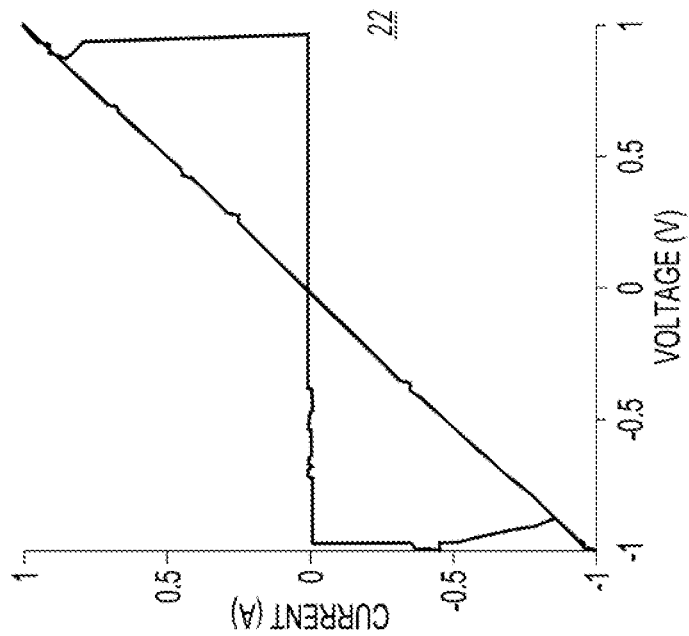

As employed herein, the term "number" shall mean one or an integer greater than one (i.e., a plurality).

As employed herein, the term "processor" shall mean a programmable analog and/or digital device that can store, retrieve, and process data; a computer; a digital signal processor; a controller; a workstation; a personal computer; a microprocessor; a microcontroller; a microcomputer; a central processing unit; a mainframe computer; a minicomputer; a server; a networked processor; or any suitable processing device or apparatus.

In accordance with the disclosed concept, an electric load categorization by graphical methods examines the relationship between physical electrical circuits and their corresponding features. With a thorough understanding of electric appliances, feature extraction is driven by an understanding of the relationship between different steady state current waveforms and their corresponding circuit topologies, and the resultant features are defined in a load model-driven manner rather than through mere data mining (also known as a purely data-driven approach). Electrical signatures of loads are extracted from V-I trajectories. The V-I trajectories are first mapped to a grid of cells, each of which is assigned a binary value. A set of simple, but efficient features, are then extracted from the mapped cell grid with binary values. This established relation is very helpful to optimize the feature space and to define simpler features. The disclosed mapping to cell grids with binary values aims at bypassing a discrete Fourier Transform (DFT) operation and reducing the required computational resources. It also provides a description of the limitation of steady state features used in prior proposals.

U.S. Patent Application Pub. No. 2013/0138669, entitled: "System And Method Employing A Hierarchical Load Feature Database To Identify Electric Load Types Of Different Electric Loads", which is incorporated by reference herein, discloses a system and method that employs a hierarchical load feature database and classification structure as model-driven guidance for optimized feature selections.

The disclosed concept fits in the Level-1 categorization in the hierarchical load identification framework as disclosed by Pub. No. 2013/0138669, and focuses on the steady state feature extraction. Because of the potential limitation of using only the steady state features, a finer granularity for load identification can be achieved by introducing the load identification/categorization in Level-2 and Level-3 in the hierarchical load identification framework of Pub. No. 2013/0138669.

A hierarchical load feature database comprises three layers, although more than three layers can be employed. The first layer or level (Level-1) is the load category, the second layer or level (Level-2) is the load sub-category, and the third layer or level (Level-3) is the load type, which includes a plurality of different load types.

Non-limiting examples of load categories of the first level include resistive loads, reactive loads, nonlinear with power factor correction, nonlinear without power factor correction, nonlinear with transformer, nonlinear with phase angle control, and complex structure.

Non-limiting examples of load sub-categories of the second level include resistive loads, such as lighting tools, kitchen appliances and personal care appliances; reactive loads, such as linear reactive loads and nonlinear with machine saturations; nonlinear with power factor correction, such as large monitors, television equipment and other large consumer electronic devices; nonlinear without power factor correction, such as imaging equipment, small monitors and televisions, personal computers (PCs), electronic loads with a battery charger, lighting loads and other small electronic devices; nonlinear with transformer, such as small electronics without a battery charger and others with a battery charger; and complex structures, such as a microwave oven.

A few non-limiting examples of load types of the third level are incandescent lamps (<100 W) for lighting tools, and a bread toaster, a space heater and other appliances for kitchen and personal care appliances.

Load Categorization by Front-End Electronic Circuit Topologies

The electric signals, i.e., voltage and current waveforms, of PELs during steady state are directly related to the circuit topology of their front-end power supply units. The first level, i.e. Level-1 in Table 1, below, includes seven load categories: resistive loads (R); reactive predominant loads (X); electronic loads (E-loads) with a power factor correction circuit (P); electronic loads without a power factor correction circuit (NP); linear power supply using transformer to boost voltage (T); phase angle controllable loads (PAC); and complex structures (M).

The majority of resistive loads (R) are used for heating, cooking and lighting. Non-limiting examples of such loads include space heaters, coffeemakers and incandescent lamps. For reactive loads (X), the appliances often consist of compressors, motors or chillers. The motors commonly used for appliances are often small DC motors. Non-limiting examples of such loads in this sub-category are fans, washers, refrigerators and shredders. The next two large groups of appliances are all electronic loads, denoted as categories P and NP in Table 1. Since the IEC Standard 61000-3-2 limits harmonic current level for all the loads with power above 75 watts, it can be assumed that a power factor correction (PFC) module is needed to meet this requirement. Therefore, category P refers to electronic loads with PFC. Personal computers over 75 W, projectors, LCD TVs, LED TVs (working in the "high quality mode"), Plasma TVs, home theaters and game consoles, also all belong to Category P. In contrast, Category NP refers to electronic loads that do not utilize power factor correction techniques. Small devices, such as cellular telephone chargers, portable DVD players, adaptors of portable printers, scanners, facsimile machines and multiple function devices (MFD) using inkjet, PC monitors, LED TVs (operating in the energy saving mode) and PCs (operating in a low power mode) are major loads in this sub-category. Loads in Category T refer to those low power appliances that use linear DC power supplies with a relatively small transformer at the front-end. Battery chargers, paper punchers and staplers are non-limiting examples of representative loads in this category. Devices such as light dimmers that use thyristor phase angle voltage control are listed in the PAC category. Category M includes appliances that often have relatively high power consumption, and multiple electrical systems, such as microwave ovens and laser printers. Furthermore, category M loads also include PELs that operate at several different power levels and switch between these power levels repeatedly during usage. These PELs are programmed to operate in this repeated switching-mode manner because their functional performance may require repeated processes in a certain sequence. For example, most high volume printers have two print engines in a single device and are able to print both sides of the paper in a single pass. A double-sided printing job is a repeated process of feeding a piece of paper, printing and rolling the paper forward, holding the paper for the ink to dry, reversing the paper backward to print on the other page, and feeding the next piece of paper for fast printing. The two engines are programmed to operate in different combinations during this repeated process, and these combinations could fall into one or several categories listed above.

TABLE 1

| Seven Load Categories by Front-End Electronic Topologies | Example Plug-in Loads under Each Category |
|---|---|
| R: Resistive Loads | R1: Incandescent Lamps (<100 W) |
| | R2: Space Heater |
| | R3: Bread Toaster |
| | R4: Coffee Machines- |
| | Other Kitchen Appliances |
| X: Reactive Predominant Loads | X1: Fans |
| | X2: Refrigerator (any with chiller) |
| | X3: Vending Machine |
| | X4: Shredder |
| P: E-loads with PFC | P1: PC (Desktop/Laptop) (>75 W) |
| | P2: Projectors |
| | P3: Big TVs (LCD/LED) (>75 W) |
| | P4: Home Theater/Game Consoles (70-80 W) |
| NP: E-loads without PFC | nP1: PC (Laptop) (<75 W) |
| | nP2: Charger (any with battery) |
| | nP3: Other Small Electronic Devices |
| | nP4: FL/CFL |
| | nP5: Portable MFD/Printer/Scanner |
| | nP6: PC Monitors |
| T: Linear Loads | T1: Small Electronics (e.g., Stapler) |
| | T2: AA Battery Charger |
| PAC: Phase Angle Controlled Loads | PAC1: Dimmer |
| | PAC2: Others with Thyristor Controlled Rectifier |
| M: Complex Structure | M1: Microwave Oven |
| | M2: Printer/Copier/Facsimile Machine/MFD |

Typical VI Trajectories of Plug-in Load Categories

FIGS. 1A-1G show plots 2, 6, 10, 14, 18, 22, 26 of current versus voltage and plots 4, 8, 12, 16, 20, 24, 28 of normalized current versus normalized voltage for the V-I trajectories of representative loads in the above load categories R, X, P, NP, T, PAC and M, respectively. Since only the Level-1 categories are considered in the first step, all of the loads present very distinct characteristics from one category to another. By applying a relatively very simple feature space, it is feasible to realize the Level-1 load category identification, which makes it a potential solution for a low-cost, embedded system implementation of plug-load identification.

From FIGS. 1A-1G, it can be observed that the normalized V-I trajectories from the different load categories appear different. A prior proposal based on 126 sets of operating data of different PEL types and modes summarizes that there are eight shape signatures that can be considered to describe the V-I trajectory: asymmetry, looping direction, area, curvature of the mean line, self-intersection, slope of middle segment, area of left and right segments, and peak of middle segment. However, calculating these graphical signatures still requires much computational resources since the entire V-I trajectory needs to be traversed in a certain order or direction. Also, these signatures are designed for a taxonomy of loads that is similar to the load groups defined by IEC Standard 61000-3-2. Therefore, they are not suitable for the proposed seven load categories. Furthermore, as will be discussed, these signatures extracted from V-I trajectories cannot effectively handle the diversity within each type of PEL and the similarity between different types of PELs. Instead, for the purpose of load identification, the disclosed concept employs a different set of signatures that can be extracted from V-I trajectories. Furthermore, such signatures of different categories are distinct.

Constraints of Existing Graphical Load Signatures

The existing graphical load signatures discussed above are purely based on shape features. However, different models of PELs within the same category can be equipped with similar (but not identical) front-end power supply topology. Therefore, such PELs present similar (but not identical) current waveforms as well as V-I trajectories. In this case, there can be significant differences in some of existing graphical load signatures, which are supposed to be identical as these PELs belong to the same type or category. Moreover, some existing graphical signatures may no longer be true or useful.

Figure 2A:
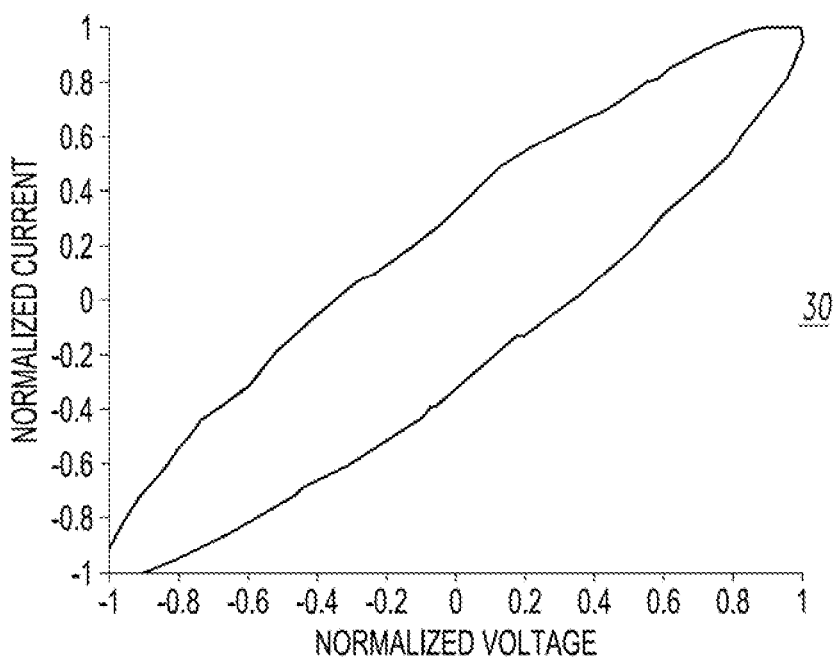
FIGS. 2A-2D are plots of normalized current versus normalized voltage for the V-I trajectories of four particular example loads.
Figure 2B:
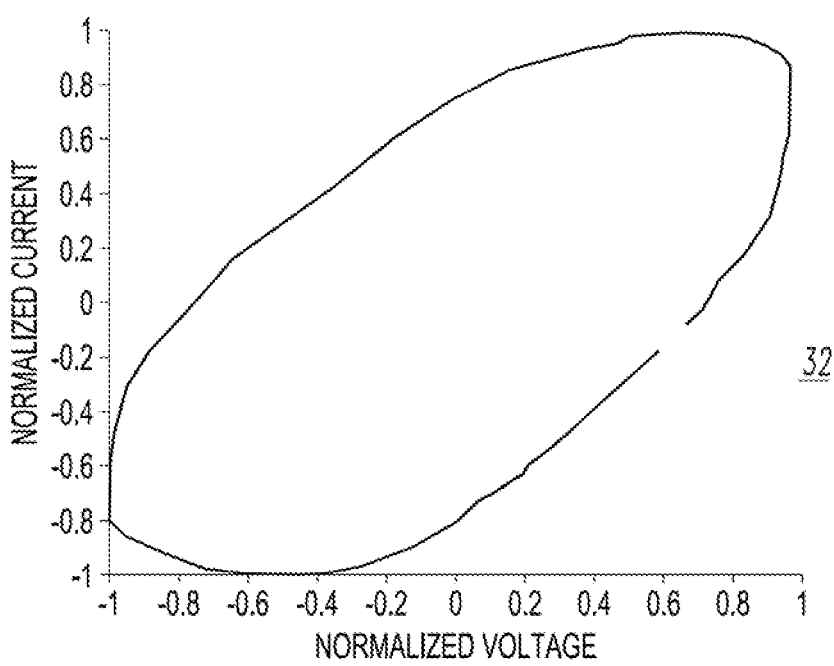
Figure 2C:
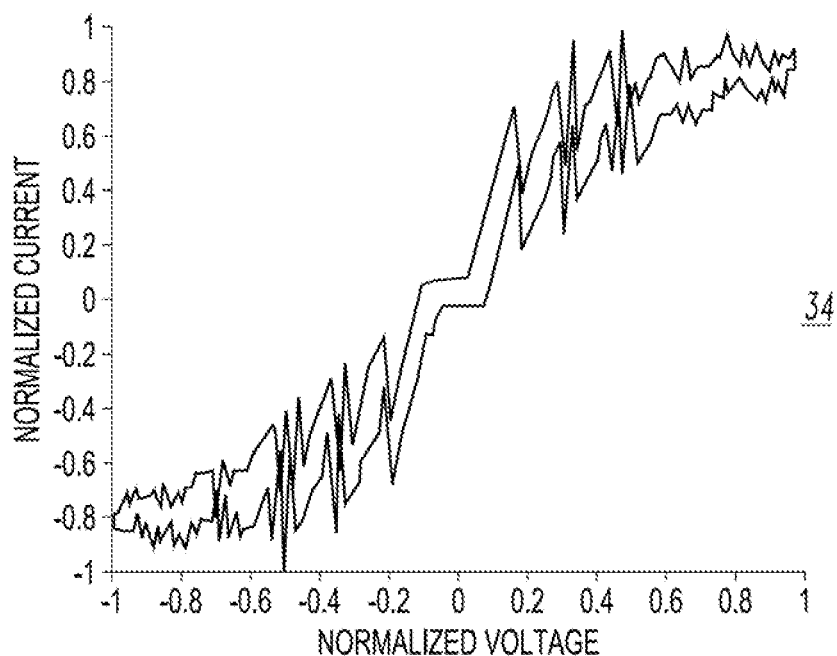
Figure 2D:
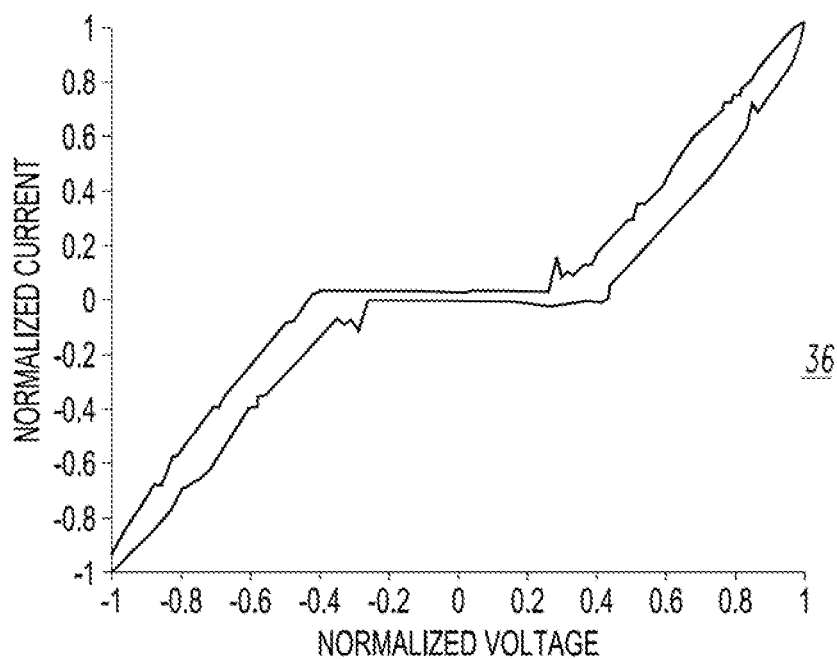

Several example plots 30, 32, 34, 36 of normalized current versus normalized voltage for the V-I trajectories of particular loads are shown in FIGS. 2A-2D, respectively. FIGS. 2A and 2B show the plots 30,32 for the V-I trajectories of two portable fans (e.g., 32 inch and 9 inch, respectively). It can be observed that these two V-I trajectories have a similar shape, but quite different area values of both the entire V-I trajectory and the left and right segments as well as peak values of middle segments. As another example, FIGS. 2C and 2D show the plots 34,36 for the V-I trajectories of two flat-panel television sets (e.g., an LED and an LCD, respectively). It can be observed that these two V-I trajectories have a similar shape, but have quite different zero crossing times (and, thus, different left, middle and right segment values). Also, to determine the asymmetry, looping direction, and area of the plot 34 of FIG. 2C is relatively complicated and needs a relatively large computation time due to the oscillation in the V-I trajectory.

Binary Mapping from V-I Trajectories

Figure 3:
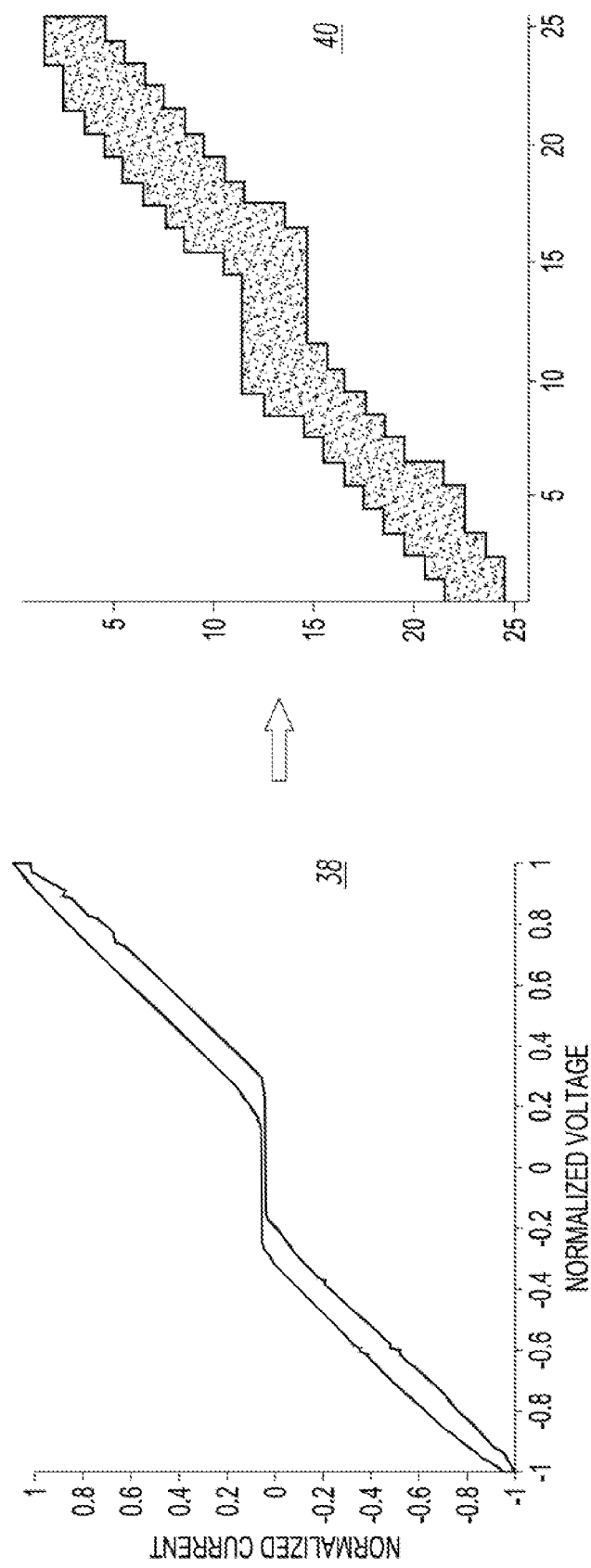
FIG. 3 is a mapping of a plot of a V-I trajectory to a binary cell grid in accordance with embodiments of the disclosed concept.

FIG. 3 shows the mapping of a plot 38 of a V-I trajectory to a binary cell grid 40. In order to effectively handle the difference between the V-I trajectories of PELs within the same load category and reduce error, the disclosed concept first maps the V-I trajectory to a grid of cells. Each cell is assigned a binary number (i.e., zero or one). If the V-I trajectory crosses a cell, then this cell is considered to be occupied by this V-I trajectory, is assigned a digital value of 1, and is shown, for example, as being solid black in FIG. 3.

The binary cell grid 40 is a generalization of V-I trajectories. V-I trajectories with similar, but not identical shapes, can have identical mapped binary cell grids. This is because two V-I trajectories can pass a cell along different paths, but the cell is yet considered as occupied and is assigned a binary value of 1. The following defines a binary cell grid mapping algorithm in accordance with the disclosed concept.

First, the voltage and current data is loaded assuming that there are a total of K data points of the form $(v_k, i_k)$, wherein:

k=1, . . . , K; and $v_k$ and $i_k$ are the voltage and current values of sample data point k, respectively.

Second, the maximal and minimal values of the voltage and current waveforms, i.e., $v_{max}$, $v_{min}$, $i_{max}$ and $i_{min}$, are computed from:

$v_{max} = \max v_k$, $v_{min} = \min v_k$, $i_{max} = \max i_k$, $i_{min} = \min i_k$, $$v_0 = \frac{1}{2}(v_{max} + v_{min}), \text{ and}$$

$$i_0 = \frac{1}{2}(i_{max} + i_{min});$$

wherein:

$v_0$ and $i_0$ are both averages of the corresponding maximal and minimal values of voltage and current, respectively, and which form the central points of the cell grid.

Physically, the $v_0$ and $i_0$ values are the DC bias values of the respective voltage and current waveforms, which are usually introduced by the DC offset of the voltage and current sensors (not shown, but see sensors 106 of FIG. 8) and/or the asymmetry between positive and negative half-cycles of the waveforms. In an ideal scenario, these DC offsets are relatively very small, or even close to zero.

Figure 4A:
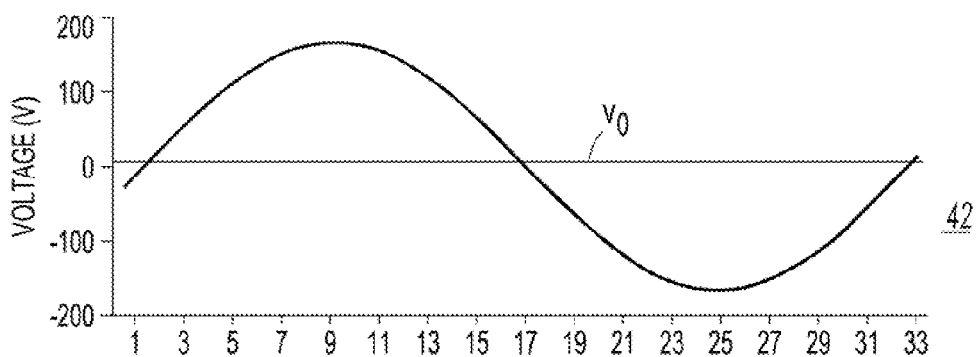
FIG. 4A is a plot of sampled voltage versus discrete sample for a particular load including an average of the maximal and minimal voltage values in accordance with an embodiment of the disclosed concept.
Figure 4B:
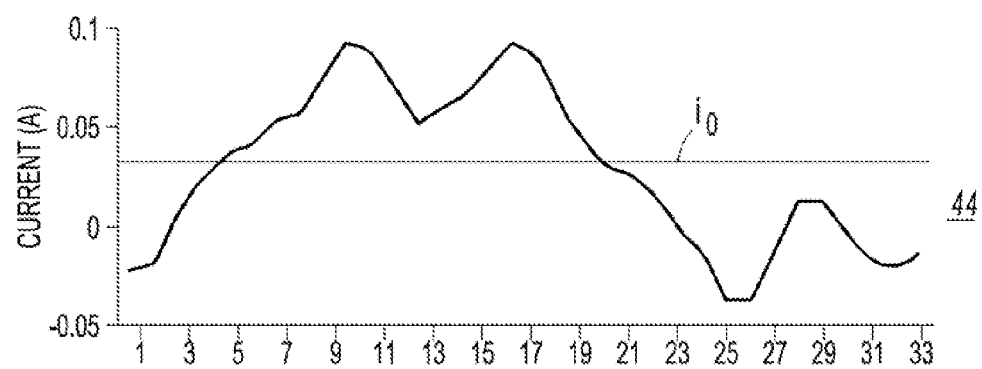
FIG. 4B is a plot of sampled current versus discrete sample for the particular load of FIG. 4A including an average of the maximal and minimal current values.
Figure 4C:
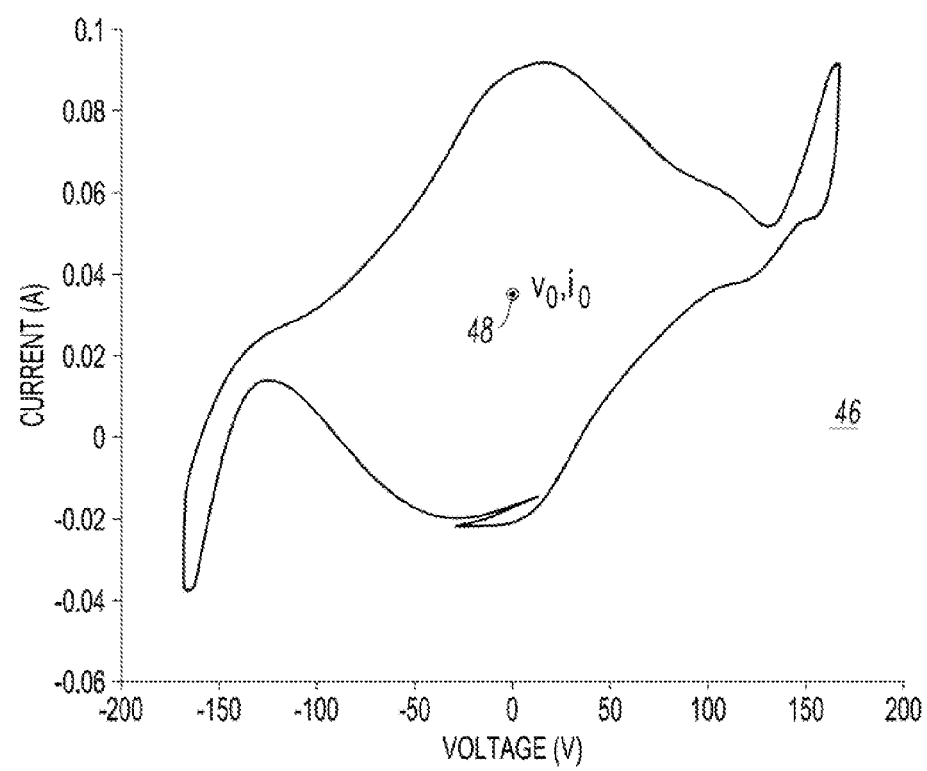
FIG. 4C is a plot of current versus voltage for the V-I trajectory of the particular load of FIG. 4A showing the averages of maximal and minimal voltage and current values.

FIGS. 4A-4C show an example with a DC bias ($i_0$) of 0.032 A on the current waveform (FIG. 4B), and a DC bias ($v_0$) of 0.7 V on the voltage waveform (FIG. 4A). FIG. 4A shows a plot 42 of sampled voltage versus discrete sample for a particular load. FIG. 4B shows a plot 44 of sampled current versus discrete sample for the particular load of FIG. 4A. FIG. 4C shows a plot 46 of the current versus the voltage for the V-I trajectory of the particular load of FIG. 4A and includes a point 48 for the $v_0$ and $i_0$ values.

Third, given a predefined parameter Δ, the width (or size) of the grid is defined and calculated by:

$$dv = \frac{v_{max} - v_0}{\Delta}$$

$$di = \frac{i_{max} - i_0}{\Delta}$$

and generate the two sequences:

$\{v_0 - dv \cdot \Delta, v_0 - dv \cdot (\Delta-1), \ldots, v_0, \ldots, v_0 + dv \cdot (\Delta-1), v_0 + dv \cdot \Delta\}$, and $\{i_0 - di \cdot \Delta, i_0 - di \cdot (\Delta-1), \ldots, i_0, \ldots, i_0 + di \cdot (\Delta-1), i_0 + di \cdot \Delta\}$ Here, both of these sequences have 2Δ+1 elements.

Fourth, define an N×N square cell grid, wherein:

N=2Δ+1.

The ($x^{th}$, $y^{th}$) cell is assigned with a positional value ($v_0 + dv \cdot x$, $i_0 + di \cdot y$) and a binary model value $B_{x,y}$, which is initialized to be 0.

Figure 5A:
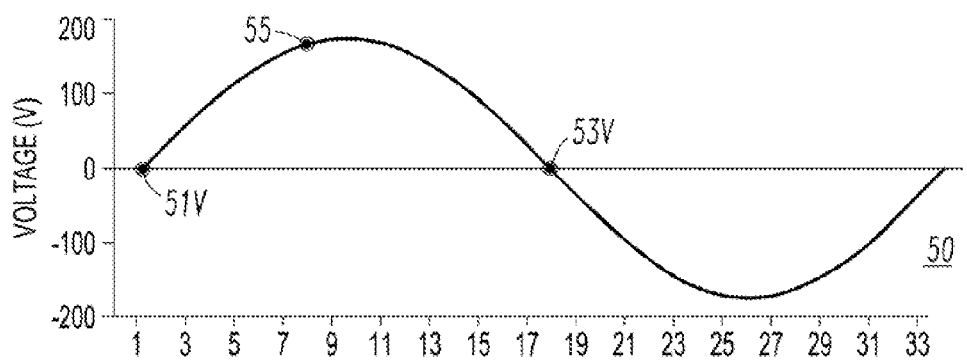
FIG. 5A is a plot of sampled voltage versus discrete sample for a particular load including a particular voltage sample in accordance with an embodiment of the disclosed concept.
Figure 5B:
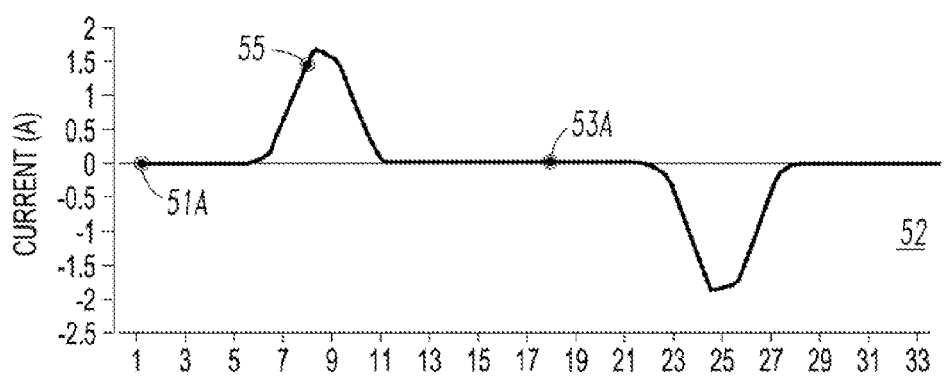
FIG. 5B is a plot of sampled current versus discrete sample for the particular load of FIG. 5A including a particular current sample.
Figure 5C:
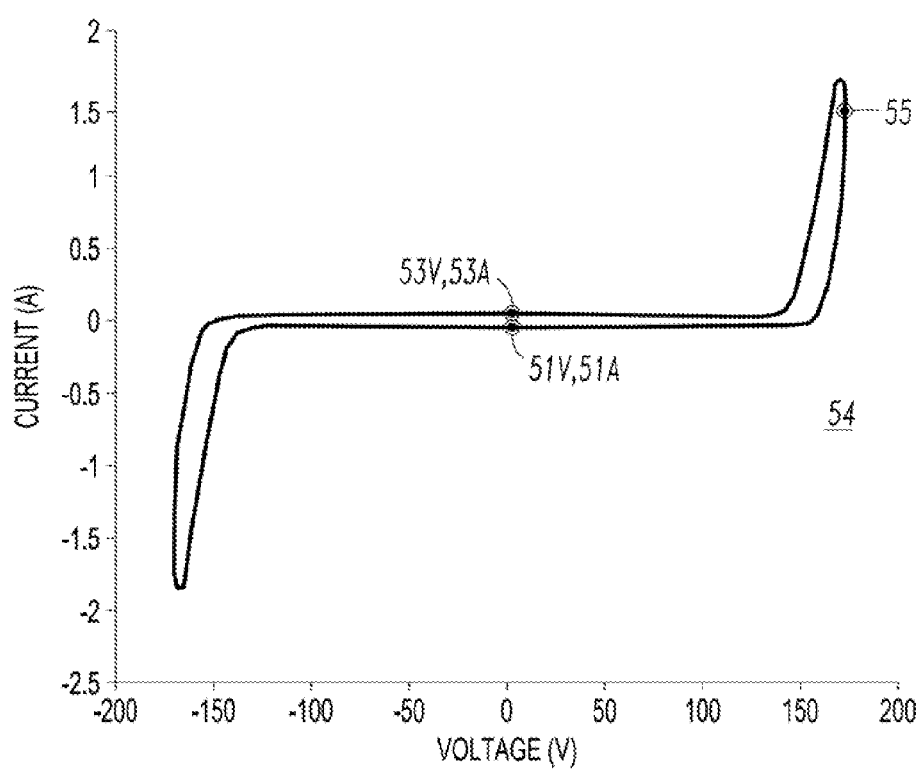
FIG. 5C is a plot of current versus voltage for the V-I trajectory of the particular load of FIG. 5A showing the particular voltage and current sample.

Fifth, load one-half line cycle of data points as shown in FIGS. 5A-5C. The one-half cycle of the voltage waveform 50 (FIG. 5A) and the one-half cycle of the current waveform 52 (FIG. 5B) starts from the voltage zero-crossing point at 51V (FIG. 5A) with a positive gradient (i.e., the voltage value crosses zero from a negative value to a positive value), and ends at another voltage zero-crossing point 53V (FIG. 5A) with a negative gradient (i.e., the voltage value crosses zero from a positive value to a negative value). Similar starting and ending points 51A,53A (FIG. 5B) for the current waveform 52 are shown in FIG. 5B. The starting points 51V,51A, the ending points 53V,53A, and one example current/voltage sample value $(v_k, i_k)$ 55 are shown in the voltage versus current plot 54 of FIG. 5C.

Sixth, starting with the first data point 51V,51A of the data points loaded in the previous step, which is denoted by $(v_1^h, i_1^h)$, execute the following loop:

```
for every cell (Δ + 1, y), y = Δ + 1, Δ + 2, . . . , 2Δ + 1:
    if (v₁ʰ − v₀) < dv/2 and (i₁ʰ − (i₀ + y·di)) < di/2
        cell (Δ + 1, y) is occupied and B_{Δ+1, y} = 1;
        cell (Δ + 1, y) is stored as the winner of (v₁ʰ, i₁ʰ);
        BREAK;
    end
end
```

In the above execution loop, every cell, (Δ+1, y), for y=Δ+1, Δ+2, . . . , 2 Δ+1, in the grid is determined whether it is occupied by a certain data point, $(v_1^h, i_1^h)$. If one cell is determined to be occupied by this data point, then this cell is denoted as the winner for this data point. Once the winner cell is determined, the loop BREAKs (also known as the loop being terminated) for this data point. If this data point is the first in the data sequence (i.e., half-cycle of data points from the fifth step), this step also marks the occupied cell as the starting cell.

Seventh, the sixth step is repeated by searching and determining the cell occupancy for the remaining half-cycle data points from the fifth step. To speed up the execution process, only, for example, the eight adjacent cells of a previous winner are considered for each searching loop.

Eighth, repeat from the sixth step for a predetermined number (e.g., without limitation, the number of data points in a half-cycle; tens or hundreds; any suitable number) of times.

The coefficient Δ defines the width of each cell and, thus, the number of cells within the cell grid. The size of the grid should be chosen based on different applications. If there are too many cells, then the mapping of V-I trajectories to the binary cell grid may not effectively handle the variance of similar V-I trajectories. However, the mapped binary cell grid may not correctly represent the V-I trajectories if the number of cells is not sufficient.

Feature Extraction Based on Binary V-I Cell Grid

Besides reducing the error introduced by the difference between V-I trajectories of PELs within the same load category, the mapping of V-I trajectories onto binary cell grids can also reduce the effect of distortion, but preserve the graphical characteristics. For each category of PELs, the disclosed concept employs a set of novel signatures that can be directly identified from the binary cell grid.

Figure 6A:
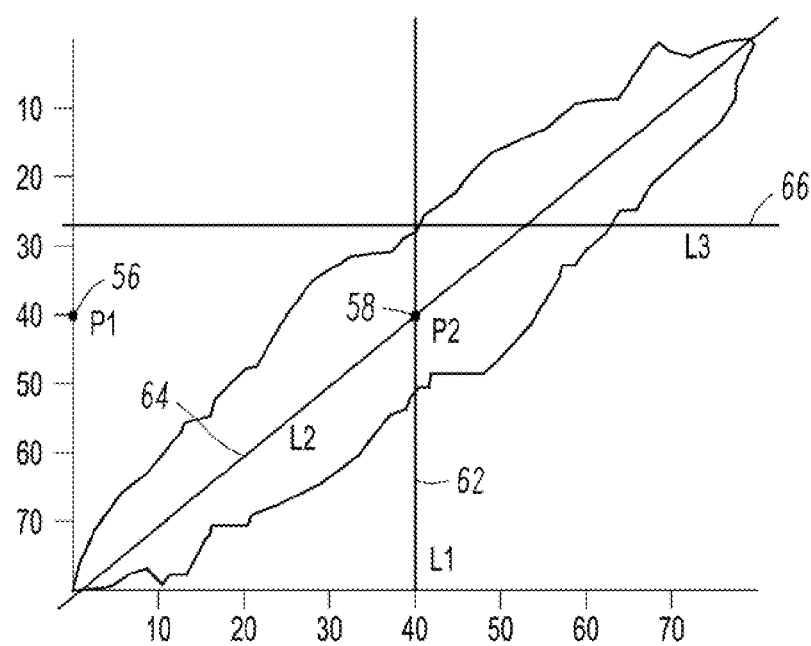
FIGS. 6A and 6B are example plots of binary cell grids in accordance with embodiments of the disclosed concept.
Figure 6B:
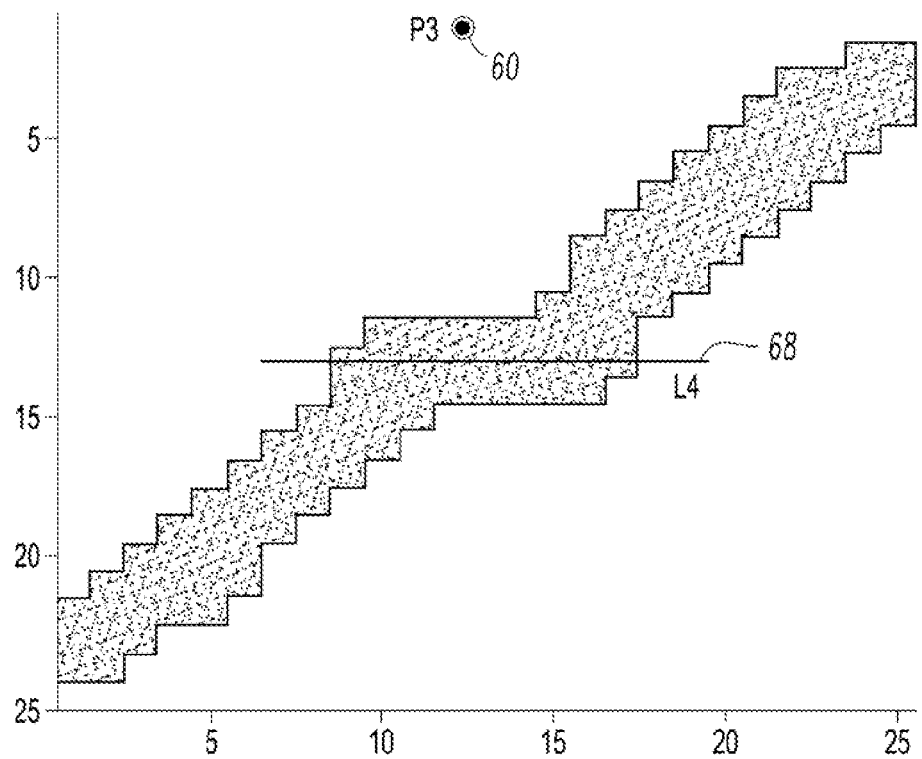

FIGS. 6A and 6B graphically depict three key points or cells (P1, P2, P3) 56, 58, 60 and four key lines (L1, L2, L3, L4) 62, 64, 66, 68 as features in a binary cell grid. The following gives an example of a set of eight features that can be used to identically represent each load category:

(1) Feature1: the binary value of the left horizontal cell (1,Δ+1), marked as cell P1 56 in FIG. 6A, where the applicable values include: 0 (cell-unoccupied), and 1 (cell-occupied);

(2) Feature2: the binary value of the central cell (Δ+1,Δ+ 1), marked as cell P2 58 in FIG. 6A, where the applicable values include: 0 (cell-unoccupied), and 1 (cell-occupied);

(3) Feature3: the multiplication of anti-diagonal grid cell values, i.e., the multiplication of the binary values of all cells along the diagonal line (marked as line L2 64 in FIG. 6A) in the grid from the lower left corner to the upper right corner. This number is also of binary value and indicates whether the V-I trajectory is linear, or in other words, whether the V-I trajectory is aligned with the diagonal line. The applicable values of this Feature3 include: 1 (linear) when the V-I trajectory is of the shape of a straight line from the lower left corner to the upper right corner with the examples as shown in FIG. 1A; and 0 (non-linear) when at least one of the anti-diagonal cells is not occupied and the V-I trajectory is not a straight line with the examples as shown in FIGS. 1B-1G;

(4) Feature4: the number of continuums of grid cells with value 1 within all cells (Δ+1,[1:2Δ+1]), which indicates the number of intersections of the V-I trajectory and the base voltage v₀ line (marked as line L1 62 in FIG. 6A); the notation 1:2Δ+1 denotes all integers from 1 to 2Δ+1; the applicable values include: 1 (one-cell), and 2 (two-cells);

(5) Feature5: whether there exists any self-crossing intersections of the V-I trajectory itself; the applicable values include: 0 (none), 1 (one-intersection), 2 (two-intersections), and so forth;

(6) Feature6: the number of intersections of the V-I trajectory with the 1.3v₀ line (marked as line L3 66 in FIG. 6A); the applicable values include: 1 (one-intersection), and 2 (two-intersections);

(7) Feature7: the existence of a central horizontal line-segment (marked as line L4 68 in FIG. 6B); this line L4 occupies 30% of the entire horizontal line, where y=0 in the grid; the existence of such a line is determined if 50% of the line is overlapped with part of the V-I trajectory; the applicable values include: 0 (no-horizontal-line), and 1 (with-horizontal-line); and (8) Feature8: the binary value of the top-middle cell (Δ+1, 1), marked as cell P3 60 in FIG. 6B; the applicable values include: 0 (cell-unoccupied), and 1 (cell-occupied).

Number of Self-Crossing Intersections

Figure 1G:
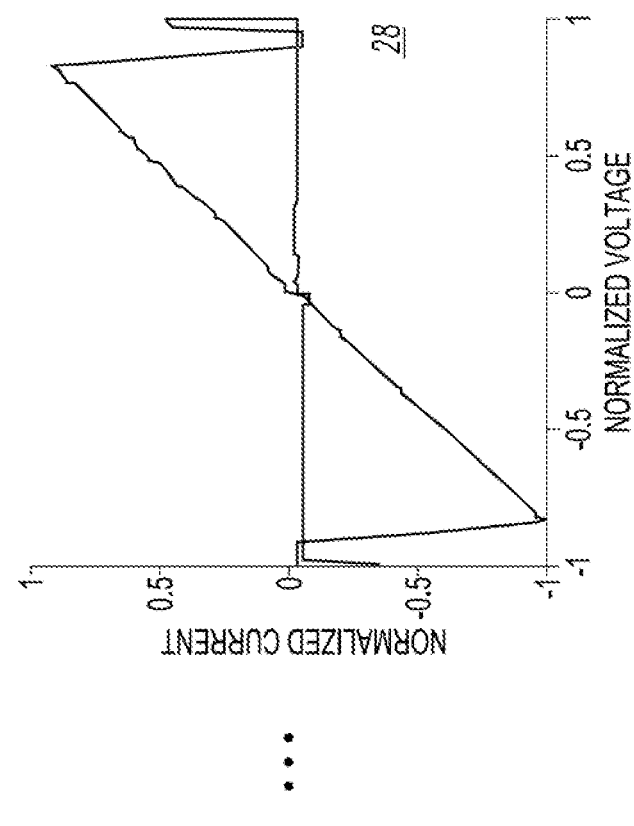
Figure 1G:
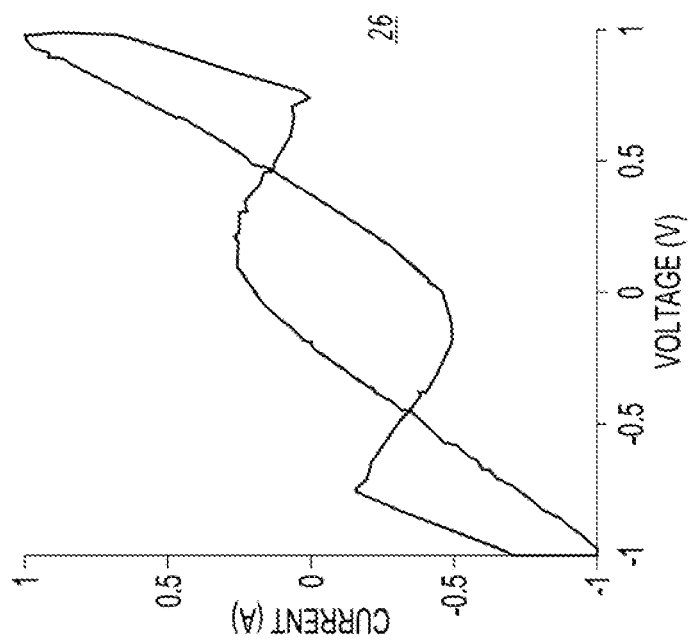
Figure 7:
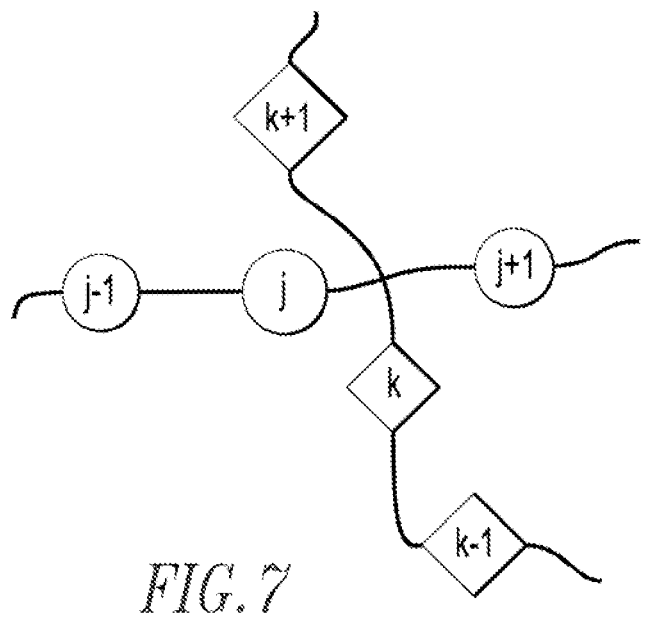
FIG. 7 is a plot of a self-crossing intersection contained by a V-I trajectory in accordance with an embodiment of the disclosed concept.

The V-I trajectories of some electric loads cross-intersect themselves, as is shown, for example, in FIG. 1G. A prior proposal might suggest that the number of self-crossing intersections contained by a V-I trajectory could be related to the order of harmonics. For example, a simulated load with a significant $3^{rd}$ (or $5^{th}$) harmonic component in the current has two (or four) self-crossing intersections. However, it can also be caused by loads in Category M (i.e., loads with multiple independent front-end power supply units). Therefore, the disclosed concept employs a general, but yet low-cost, algorithm to determine the number of self-crossing intersections contained by a V-I trajectory, as shown in FIG. 7.

First, read one-half line cycle (e.g., $\frac{1}{120}$ second)

of sampled data points [0_, 0_+], starting with the zero-crossing data point from negative voltage values to positive voltage values (denoted by 0_) and ending with the zero-crossing data point from positive voltage values to negative voltage values (denoted by 0_+).

Second, for every data point j within the region [0_, peak_+], where peak_+ denotes a data point in [0_, 0_+] with the maximal positive voltage value, find the data point k whose voltage value is closest to point j.

Third, denote a data point j with voltage value $v_j$ and current value $i_j$ by a vector $\underline{j}$, and check whether values of the current of the data point sequence $\{\underline{j-1},\underline{j},\underline{j+1}\}$ and $\{\underline{k-1}, \underline{k}, \underline{k+1}\}$ are monotonically increasing; if yes, go to the fourth step, below, and, if not, then repeat this third step starting with $\underline{j+1}$.

Fourth, check whether data points $\underline{k-1}=(v_{k-1}, i_{k-1})$ and $\underline{k+1}=(v_{k+1}, i_{k+1})$ are on the different side of the line determined by $\underline{j-1}=(v_{j-1}, i_{j-1})$ and $\underline{j+1}=(v_{j+1}, i_{j+1})$ using the following criterion:

$$\{(\underline{j+1}-\underline{j-1})\times(\underline{j+1}-\underline{k-1})\}\cdot\{(\underline{j+1}-\underline{j-1})\times(\underline{j+1}-\underline{k+1})\}0$$

wherein:
  × denotes the cross product; and
  · denotes the dot product.

In other words, for any j and k, an instance when the criterion of the fourth step is satisfied is considered as being a self-crossing intersection.

Numerical Test Results

The disclosed concept can be employed in combination with the teachings of any or all of: (1) U.S. Patent Application Pub. No. 2013/0138651, entitled: "System And Method Employing A Self-Organizing Map Load Feature Database To Identify Electric Load Types Of Different Electric Loads"; (2) U.S. Patent Application Pub. No. 2013/0138661, entitled: "System And Method Employing A Minimum Distance And A Load Feature Database To Identify Electric Load Types Of Different Electric Loads"; and (3) U.S. patent application Ser. No. 13/597,324, filed Aug. 29, 2012, entitled: "System And Method For Electric Load Identification And Classification Employing Support Vector Machine", all of which are incorporated by reference herein.

In accordance with the teachings of the disclosed concept, the resultant binary V-I features extracted from the mapped cell grid with binary values can be used as inputs to any or all of the classification and identification systems disclosed in the above three patent applications to derive the category of the load under observation. With reference to the hierarchical load identification architecture as disclosed in Pub. No. 2013/0138669, the disclosed concept can be applied to provide the features needed by the Level-1 load category identification. The categorization of the loads can be conducted by applying a Supervised Self-Organizing Map (SSOM) or a self-organizing map (SOM) (also known as a self-organizing feature map (SOFM)) that is a type of unsupervised artificial neural network that is trained using competitive learning to produce a relatively low-dimensional (typically two-dimensional), discretized representation of the input space of training samples, called a map, as disclosed by Pub. No. 2013/0138651.

Test on Five Major Load Categories

Five of the load categories (i.e., R, X, NP, P and M) cover the majority of existing PELs. The following discusses the success rate of identifying loads from these five load categories by using the first five features disclosed herein. The proposed graphical signatures from binary mapping of V-I trajectories for these five categories of PELs are expected to have values (where "X" means either 0 or 1) as shown in Table 2.

TABLE 2

| Category | Feature 1 | Feature 2 | Feature 3 | Feature 4 | Feature 5 |
|---|---|---|---|---|---|
| R | 0 | 1 | 1 | 1 | 0 |
| X | 0 | 0 | 0 | 2 | 0 |
| NP | 1 | 1 | 0 | 1 | 0 |

TABLE 2-continued

| Category | Feature 1 | Feature 2 | Feature 3 | Feature 4 | Feature 5 |
|---|---|---|---|---|---|
| P | 0 | 1 | 0 | 1 | 0 |
| M | 0 | X | 0 | 2 | 1 or more |

For each category, a number of PELs are tested and each PEL is independently tested 100 times. The result is shown in Table 3.

TABLE 3

| Category | Total Number of Loads | Total Number of Tests | Total Number of Correct Results | Success Rate |
|---|---|---|---|---|
| R | 6 | 600 | 597 | 99.5% |
| X | 10 | 1000 | 991 | 99.1% |
| P | 15 | 1500 | 1493 | 99.5% |
| NP | 11 | 1100 | 1091 | 99.2% |
| M | 4 | 400 | 395 | 98.8% |

In summary, the proposed graphical signatures from binary mapping of V-I trajectories achieve an average of over a 99% accuracy rate. The identification of loads from Category M (i.e., loads with multiple independent front-end power supply units) has the lowest accuracy in Table 3. This is mainly due to the wide diversity of loads in this category.

Test on all Seven Load Categories

In this test, all seven load categories are considered. The proposed graphical signatures from binary mapping of V-I trajectories for the seven categories of PELs are expected to have values as shown in Table 4.

TABLE 4

| Category | Feature 1 | Feature 2 | Feature 3 | Feature 4 | Feature 5 | Feature 6 | Feature 7 | Feature 8 |
|---|---|---|---|---|---|---|---|---|
| R | 0 | 1 | 1 | 1 | 0 | 1 | 0 | 0 |
| X | 0 | 0 | 0 | 2 | 0 | 2 | 0 | 0 |
| NP | 1 | 1 | 0 | 1 | 0 | 1 | 1 | 0 |
| P | 0 | 1 | X | 1 | 0 | 1 | 1 | 0 |
| M | 0 | X | 0 | 2 | 1 or more | 2 | 0 | 0 |
| T | 0 | 0 | 0 | 2 | 0 | 2 | 0 | 1 |
| PAC | X | 1 | 1 | 1 | 0 | 2 | 1 | 0 |

In this test, a total of 20 load types (with one to seven load models for each load type) are tested. For each data set, about 900 to about 3000 V-I trajectories are selected and mapped to a 64×64 cell grid. The results are shown in Table 5.

TABLE 5

| Target Load Category | Load Type | Total Models | Total Number of Tests | Success Rate (%) |
|---|---|---|---|---|
| NP | Battery Charger | 1 | 3000 | 83.4 |
|  | DVD Player | 4 | 3000 | 100 |
|  | Desktop Computer | 2 | 3000 | 99.8 |
|  | LCD Monitor | 7 | 3000 | 99.5 |
|  | Printer | 1 | 3000 | 99.9 |
|  | Electronic Circuit Board | 1 | 3000 | 98.7 |
| P | LCD TV | 8 | 3000 | 98.5 |
|  | LED TV | 3 | 3000 | 99.2 |

TABLE 5-continued

| Target Load Category | Load Type | Total Models | Total Number of Tests | Success Rate (%) |
|---|---|---|---|---|
| | Plasma TV | 2 | 3000 | 99 |
| | Multi Function Device | 3 | 3000 | 93 |
| | Projector | 4 | 3000 | 99.9 |
| Complex M | Microwave Oven | 4 | 1800 | 99 |
| R | Space Heater | 4 | 1800 | 93 |
| | Coffee Maker | 2 | 1800 | 98 |
| | Incandescent Lamp | 4 | 1800 | 99.2 |
| | Electric Skillet | 2 | 1800 | 98.6 |
| T | Stapler | 1 | 1800 | 98.9 |
| | Adapters | 5 | 1800 | 100 |
| X | Fan | 5 | 3600 | 98.5 |
| | Refrigerator | 4 | 3600 | 100 |
| | Water Dispenser | 1 | 3600 | 100 |
| | Shredder | 2 | 3600 | 65 |
| PAC | Incandescent Lamp with Dimmer | 1 | 1800 | 50 |

The testing results validate that the proposed graphical signatures from binary mapping of V-I trajectories can achieve an average of over a 90% accuracy rate with a relatively large load set and with seven target load categories. The major failure cases are from some PAC loads where the phase angle is less than 90°, which makes the load's features similar to what are expected for resistive loads, such that they are mistakenly categorized as being in the R-category. Increasing the sampling rate of the sensed voltage and current signals may help to improve the performance, although a trade-off should be considered in terms of memory space availability and computation burden. At the same time, from the application point of view, if an incandescent lamp with dimmer with a relatively small phase angle is identified as a resistive load, then the resulting categorization will still be acceptable.

SUMMARY

Figure 8:
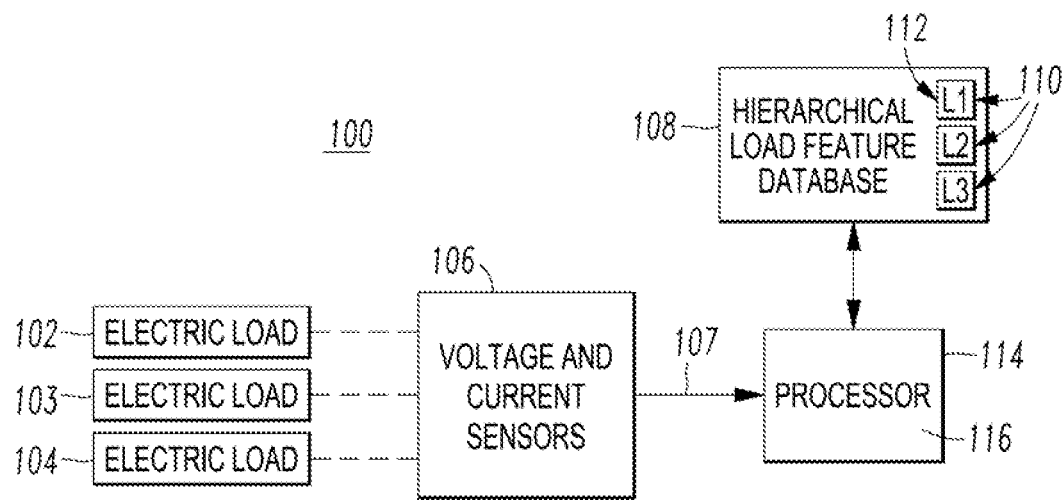
FIG. 8 is a block diagram of a system employing graphical electric load categorization to identify one of a plurality of different electric load types in accordance with embodiments of the disclosed concept.

FIG. 8 shows a system 100 for different electric loads 102, 103, 104. The system includes sensors 106 structured to sense voltage and current signals 107 for each of the different electric loads 102, 103, 104, a hierarchical load feature database 108 having a plurality of layers (L1, L2, L3) 110, with a first layer 112 (L1) of the layers 110 including a plurality of different load categories; and a processor 114. The processor 114 includes a routine 116, which in accordance with the teachings of the disclosed concept, acquires voltage and current waveforms from the sensors 106 for a corresponding one of the different electric loads 102, 103, 104; maps a voltage-current trajectory to a grid including a plurality of cells, each of which is assigned a binary value of zero or one (see, for example, FIG. 3); extracts a plurality of different features from the mapped grid of cells as a graphical signature of the corresponding one of the different electric loads 102, 103, 104; derives a category of the corresponding one of the different electric loads 102, 103, 104 from the database 108; and identifies one of a plurality of different electric load types for the corresponding one of the different electric loads 102, 103, 104.

The major advantages of the proposed binary V-I feature extraction include reducing the harmonics and noise effects on load current and voltage waveforms, providing a relatively simple abstraction of graphical shapes of trajectories, and simplifying graphical feature extraction.

The binary V-I features are relatively very easy to calculate, and take less storage since the feature values are all integers. The initial computation and memory requirements have been evaluated, and the results show that the computational cost of calculating the graphical features and the storage requirement is in the scale of x % of what is needed by a Fast Fourier Transform (FFT).

The disclosed concept employs a relatively low computational-cost, but yet accurate method and system, to extract signatures for electric load identification. Instead of utilizing digital signal processing and frequency domain analysis, the disclosed concept employs the similarity of V-I trajectories between loads and maps V-I trajectories to a cell grid with binary cell values. Graphical features are then extracted for many applications.

The disclosed concept significantly reduces the computational cost as compared to existing frequency-domain feature extraction and analysis technologies. Test results show that an average of over a 99% success rate can be achieved using the proposed signatures.

While specific embodiments of the disclosed concept have been described in detail, it will be appreciated by those skilled in the art that various modifications and alternatives to those details could be developed in light of the overall teachings of the disclosure. Accordingly, the particular arrangements disclosed are meant to be illustrative only and not limiting as to the scope of the disclosed concept which is to be given the full breadth of the claims appended and any and all equivalents thereof.

What is claimed is:

1. A system for a plurality of different electric loads, the system comprising:
   a plurality of sensors structured to sense a voltage signal and a current signal for each of the different electric loads;
   a hierarchical load feature database comprising a plurality of layers, with one of said layers including a plurality of different load categories; and
   a processor structured to:
      acquire a voltage waveform and a current waveform from the sensors for a corresponding one of the different electric loads;
      map a voltage-current trajectory to a grid including a plurality of cells, each of said cells being assigned a binary value of zero or one based on whether the voltage-current trajectory passes through each of said cells;
      extract a plurality of different features from the mapped grid of cells as a graphical signature of the corresponding one of the different electric loads;
      derive a category of the corresponding one of the different electric loads from the hierarchical load feature database; and
      identify one of a plurality of different electric load types for the corresponding one of the different electric loads.

2. The system of claim 1 wherein the hierarchical load feature database comprises three of said layers; wherein a first layer of said layers includes the different load categories; wherein a second layer of said layers includes a plurality of different load sub-categories for each of said different load categories; and wherein a third layer of said layers includes the different electric load types for said different load sub-categories.

3. The system of claim 1 wherein the different load categories include resistive loads, reactive predominant loads, electronic loads with a power factor correction circuit, electronic loads without a power factor correction circuit, electric loads including a linear power supply using a transformer to boost voltage, phase angle controllable loads, and complex structures.

4. The system of claim 1 wherein said different features are eight different features.

5. The system of claim 1 wherein said grid includes a first horizontal axis defining a count of said cells and a second vertical axis defining said count of said cells; wherein said count is a positive plural integer N; wherein N=2Δ+1; and wherein said different features are selected from the group consisting of: (1) a binary value of one of the cells at a first location of the first horizontal axis and a location Δ+1 of the second vertical axis; (2) a binary value of one of the cells at a location Δ+1 of the first horizontal axis and the location Δ+1 of the second vertical axis; (3) a binary value determined by multiplication of binary values of all cells along a diagonal line in the grid from a lower left corner to an upper right corner to indicate whether the voltage-current trajectory is linear or non-linear; (4) a number of continuums of said cells with adjacent coordinates having a binary value of one within all of said cells to indicate a number of intersections of the voltage-current trajectory and an average of a maximal value and a minimal value of the voltage waveform corresponding to the first horizontal axis; (5) a count of zero or a number of self-crossing intersections of the voltage-current trajectory; (6) a number of intersections of the voltage-current trajectory with 1.3 times the average of the maximal value and the minimal value of the voltage waveform corresponding to the first horizontal axis; (7) existence of a central horizontal line-segment that occupies at least 30% of the entire first horizontal axis and if at least 50% of the central horizontal line-segment overlaps with part of the voltage-current trajectory; and (8) a binary value of one of the cells at the location Δ+1 of the first horizontal axis and a first location of the second vertical axis.

6. The system of claim 1 wherein the voltage waveform and the current waveform each include a total of K data points of the form $(v_k, i_k)$, wherein: $k=1, \ldots, K$; wherein $v_k$ and $i_k$ are a voltage value and a current value of a sample data point k, respectively; wherein maximal and minimal values of the voltage waveform and the current waveform are computed from:

$$v_{max} = \max v_k,$$

$$v_{min} = \min v_k,$$

$$i_{max} = \max i_k,$$

$$i_{min} = \min i_k,$$

$$v_0 = \frac{1}{2}(v_{max} + v_{min}), \text{ and}$$

$$i_0 = \frac{1}{2}(i_{max} + i_{min});$$

wherein $v_0$ and $i_0$ are both averages of the corresponding maximal and minimal values, which form central points of the grid of said cells; wherein Δ defines size of said grid; wherein $$dv = \frac{v_{max} - v_0}{\Delta}$$

$$di = \frac{i_{max} - i_0}{\Delta};$$

wherein said processor is further structured to generate two sequences from the voltage waveform and the current waveform as:

$$\{v_0 - dv \cdot \Delta, v_0 - dv \cdot (\Delta-1), \ldots, v_0, \ldots, v_0 + dv \cdot (\Delta-1), v_0 + dv \cdot \Delta\}, \text{ and}$$

$$\{i_0 - di \cdot \Delta, i_0 - di \cdot (\Delta-1), \ldots, i_0, \ldots, i_0 + di \cdot (\Delta-1), i_0 + di \cdot \Delta\};$$

wherein each of said two sequences has N=2Δ+1 elements; wherein the grid of said cells includes a first axis having N of said cells and a second axis having N of said cells; and wherein each of said cells is assigned a positional value $(v_0 + dv \cdot x, i_0 + di \cdot y)$ and a binary model value $B_{x,y}$, which is initialized to be 0.

7. The system of claim 6 wherein said processor is further structured to map one-half cycle of the voltage waveform and the current waveform to the grid of said cells and to assign each of said K data points to a corresponding one of said cells with said binary model value $B_{x,y}$ of 1.

8. The system of claim 1 wherein said processor is further structured to determine a number of self-crossing intersections contained by the mapped voltage-current trajectory.

9. The system of claim 1 wherein the category of the corresponding one of the different electric load types is derived from a Supervised Self-Organizing Map.

10. The system of claim 1 wherein the category of the corresponding one of the different electric load types is derived from a self-organizing map or a self-organizing feature map trained using competitive learning.

11. A method of identifying load types for a plurality of different electric loads, said method comprising:
  sensing a voltage signal and a current signal for each of the different electric loads;
  providing a hierarchical load feature database comprising a plurality of layers, with one of said layers including a plurality of different load categories;
  providing a processor;
  acquiring, with the processor, a voltage waveform and a current waveform for a corresponding one of the different electric loads;
  mapping, with the processor, a voltage-current trajectory to a grid including a plurality of cells, each of said cells being assigned a binary value of zero or one based on whether the voltage-current trajectory passes through each of said cells;
  extracting, with the processor, a plurality of different features from the mapped grid of cells as a graphical signature of the corresponding one of the different electric loads;
  deriving, with the processor, a category of the corresponding one of the different electric loads from the hierarchical load feature database; and
  identifying, with the processor, one of a plurality of different electric load types for the corresponding one of the different electric loads.

12. The method of claim 11 further comprising:
  employing three of said layers in said hierarchical load feature database;
  including the different load categories in a first layer of said layers;

including a plurality of different load sub-categories for each of said different load categories in a second layer of said layers; and including the different electric load types for said different load sub-categories in a third layer of said layers.

13. The method of claim 11 further comprising:

including resistive loads, reactive predominant loads, electronic loads with a power factor correction circuit, electronic loads without a power factor correction circuit, electric loads including a linear power supply using a transformer to boost voltage, phase angle controllable loads, and complex structures as the different load categories.

14. The method of claim 11 further comprising:

employing as said different features eight different features.

15. The method of claim 11 further comprising:

including a first horizontal axis of said grid defining a count of said cells and a second vertical axis defining said count of said cells;

employing a positive plural integer N as said count, with $N=2\Delta+1$; and selecting said different features from the group consisting of: (1) a binary value of one of the cells at a first location of the first horizontal axis and a location $\Delta+1$ of the second vertical axis; (2) a binary value of one of the cells at a location $\Delta+1$ of the first horizontal axis and the location $\Delta+1$ of the second vertical axis; (3) a binary value determined by multiplication of binary values of all cells along a diagonal line in the grid from a lower left corner to an upper right corner to indicate whether the voltage-current trajectory is linear or nonlinear; (4) a number of continuums of said cells with adjacent coordinates having a binary value of one within all of said cells to indicate a number of intersections of the voltage-current trajectory and an average of a maximal value and a minimal value of the voltage waveform corresponding to the first horizontal axis; (5) a count of zero or a number of self-crossing intersections of the voltage-current trajectory; (6) a number of intersections of the voltage-current trajectory with 1.3 times the average of the maximal value and the minimal value of the voltage waveform corresponding to the first horizontal axis; (7) existence of a central horizontal line-segment that occupies at least 30% of the entire first horizontal axis and if at least 50% of the central horizontal line-segment overlaps with part of the voltage-current trajectory; and (8) a binary value of one of the cells at the location $\Delta+1$ of the first horizontal axis and a first location of the second vertical axis.

16. The method of claim 11 further comprising:

including a total of K data points of the form $(v_k,i_k)$ with each of the voltage waveform and the current waveform, wherein: $k=1, \ldots, K$; wherein $v_k$ and $i_k$ are a voltage value and a current value of a sample data point k, respectively; wherein maximal and minimal values of the voltage waveform and the current waveform are computed from:

$v_{max} = \max v_k$, $v_{min} = \min v_k$, $i_{max} = \max i_k$, $i_{min} = \min i_k$, $v_0 = \frac{1}{2}(v_{max} + v_{min})$, and $i_0 = \frac{1}{2}(i_{max} + i_{min})$;

wherein $v_0$ and $i_0$ are both averages of the corresponding maximal and minimal values, which form central points of the grid of said cells; wherein $\Delta$ defines size of said grid; wherein $dv = \frac{v_{max} - v_0}{\Delta}$ $di = \frac{i_{max} - i_0}{\Delta}$;

and generating two sequences from the voltage waveform and the current waveform as:

$\{v_0-dv\cdot\Delta, v_0-dv\cdot(\Delta-1), \ldots, v_0, \ldots, v_0+dv\cdot(\Delta-1), v_0+dv\cdot\Delta\}$, and $\{i_0-di\cdot\Delta, i_0-di\cdot(\Delta-1), \ldots, i_0, \ldots, i_0+di\cdot(\Delta-1), i_0+di\cdot\Delta\}$;

wherein each of said two sequences has $N=2\Delta+1$ elements; wherein the grid of said cells includes a first axis having N of said cells and a second axis having N of said cells; and wherein each of said cells is assigned a positional value $(v_0+dv\cdot x, i_0+di\cdot y)$ and a binary model value $B_{x,y}$, which is initialized to be 0.

17. The method of claim 16 further comprising:

mapping one-half cycle of the voltage waveform and the current waveform to the grid of said cells; and assigning each of said K data points to a corresponding one of said cells with said binary model value $B_{x,y}$ of 1.

18. The method of claim 11 further comprising:

determining a number of self-crossing intersections contained by the mapped voltage-current trajectory.

19. The method of claim 11 further comprising:

deriving the category of the corresponding one of the different electric load types from a Supervised Self-Organizing Map.

20. The method of claim 11 further comprising:

deriving the category of the corresponding one of the different electric load types from a self-organizing map or a self-organizing feature map trained using competitive learning.

* * * * *